United States Patent [19]

Chumbley

[11] 4,433,019

[45] Feb. 21, 1984

[54] INSULATIVE FABRIC

[76] Inventor: James F. Chumbley, 16108 Inglewood Rd., Bothell, Wash. 98011

[21] Appl. No.: 439,748

[22] Filed: Nov. 8, 1982

[51] Int. Cl.³ .............................................. B32B 5/12
[52] U.S. Cl. .................................. 428/110; 428/109; 428/247; 428/284; 428/286; 428/287; 428/300; 428/398; 428/457; 428/458
[58] Field of Search .............. 428/234, 235, 238, 239, 428/247, 284, 286, 287, 300, 340, 480, 458, 398, 85, 95, 137, 138, 920, 110, 109; 156/148; 28/107

[56] References Cited

U.S. PATENT DOCUMENTS 3,009,601 11/1961 Matsch ................................ 428/138
3,461,026  8/1969 Schick ................................. 428/300
4,062,993 12/1977 Seward ................................ 428/138

Primary Examiner—James J. Bell
Attorney, Agent, or Firm—Seed and Berry

[57] ABSTRACT

An insulative fabric generally comprises a central sheet of breathable, substantially crinkle-free, pliant, aluminized polymeric film and spaced layers of hollow, microtubular, filamentous synthetic insulation sandwiching the film. The polymeric film has sufficient tensile strength for use as a quilting fabric in quilts, comforters, or clothing, and its tensile strength may be enhanced by use of a scrim backing sheet placed directly adjacent the film. The spaced layers of synthetic insulation are individually needle-punched through the film to reduce the overall thickness of the insulation without substantially reducing the insulative capacity of the fabric and to provide passageways through the film so that the film is breathable. In this manner, the fabric has a soft, fleecy quality, is of a substantially uniform thickness, and is substantially noiseless when folded or wrinkled.

9 Claims, 2 Drawing Figures

INSULATIVE FABRIC

TECHNICAL FIELD

The present invention relates to a novel insulative fabric comprising a sandwich of synthetic insulation around an aluminized polymeric film.

BACKGROUND ART

Conventionally, quilting material for quilts or clothing includes use of natural material, such as goose or duck down, which is blown into envelopes stitched in the quilt. Although extremely warm when fluffed and dry, down is a poor insulator when packed or wet. To overcome this problem, fibrous polymeric materials which trap air within their porous structures have been developed. HOLLOFILL TM (a registered trademark of the DuPont Company) is a filamentous, microtubular polyester which is produced in mats so that the fibers form a filter-like material. This synthetic insulator is superior to down because it is less susceptible to packing and is effective even when wet. In use, however, even the synthetic insulators have the problem of bunching within the quilting. By bunching, the insulative capacity of the clothing or comforter is nonuniform across the entire fabric because less insulation is provided in certain areas, such as the quilting lines, where the fabric is drawn tightly together. Furthermore, to provide the same insulative capacity of natural insulators, it is commonly necessary to use a thick layer of synthetic insulation. Substitution of synthetic insulation for the natural insulation is therefore hindered.

DISCLOSURE OF INVENTION

The present invention relates to a novel insulative fabric which provides a warm, uniformly insulative, substantially crinkle-free, thin (although highly resistive to heat transfer), soft, fleecy-quality, reflective, breathable, lightweight insulative fabric which is suitable for use in quilts, comforters, or clothing. The insulative fabric will not bunch up and is thereby better suited to provide a uniform insulation.

In general terms, the insulative fabric comprises a substantially crinkle-free, pliant, aluminized polymeric film sandwiched between spaced layers of synthetic insulation which is needle punched through the film to reduce the overall thickness of the insulation without substantially reducing its insulative capacity and to provide passageways through the film so that the film is breathable. A fabric of this nature is soft and fleecy in character, is of a substantially uniform, predetermined thickness, and is substantially noiseless when folded or wrinkled. Aluminized polymer films of the prior art are unsuitable for use in the fabric of the present invention because they crinkle or rustle when folded or wrinkled. An example of an unsuitable aluminized polymeric film is the "Space Blanket," which is an aluminized MYLAR TM (a trademark of the DuPont Company). The polyester film in most aluminized reflective layers is too rigid and inflexible to provide the desired characteristics of the polymeric film of the present invention.

In a preferred embodiment, the synthetic insulation is hollow, microtubular, filamentous insulation which is designed in a mat to provide a soft, fleecy quality to the insulation. The filaments of this type of insulation are easily needle punched through the reflective film to reduce the overall thickness of the fabric which is produced.

Generally, the polymeric film is an aluminized polyethylene having a polyethylene film thickness of less than about 1.25 mils and an aluminization of approximately 8 ohms.

To provide additional tensile strength for the insulative fabric, a scrim sheet of nonwoven polyester material is placed adjacent to the reflective film to provide additional strength so that the fabric may be used as a quilting material in quilts, comforters, or clothing.

Because the synthetic insulation is needle punched through the reflective layer, the insulative fabric of the present invention is prevented from bunching up. The filaments of the synthetic insulation extend through the synthetic film and are thereby stuck in a defined position. Use of microtubular, hollow, filamentous insulation is preferred because this material provides improved insulative capacity for a given weight of synthetic insulation. Also, the hollow tubes provide a softer, more fleecy quality to the overall mat of synthetic insulation and provides the desired appearance of warmth and softness.

When completed, the insulative fabric of the present invention is generally less than about 0.50 inch thick (1.27 cm) so that it is easily incorporated into comforters, quilts, or clothing. The fabric has between about 5–15 ounces of synthetic insulation per square yard of fabric and provides a high resistance to heat transfer because of the relatively high amount of synthetic insulation per square yard and the reflective capacity of the inner reflective film. Still, because the synthetic insulation is needle-punched through the reflective film, the overall insulative fabric is able to breath. An insulative fabric of the present invention is substitutable for natural insulation. This new insulative fabric provides enhanced heat transfer resistance per volume of insulative fabric and is highly desirable for use in quilts, comforters, or clothing. A relatively thin, nonbulky, insulative fabric can more nearly perform with the characteristics of natural insulators and is easily handled in production.

BEST MODE FOR CARRYING OUT THE INVENTION

Figure 1:
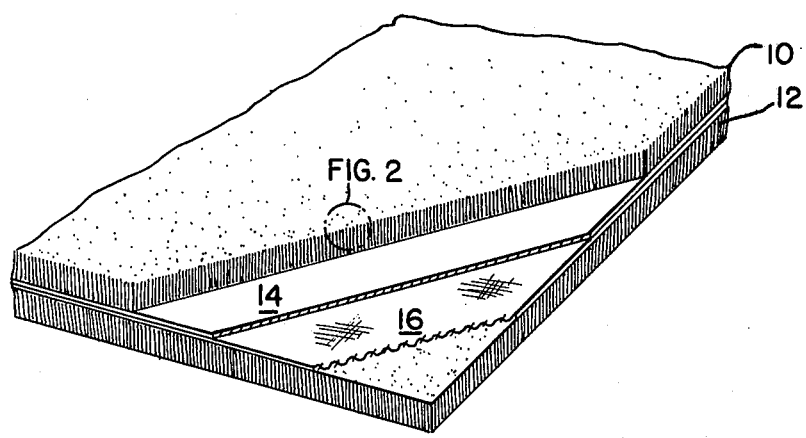
FIG. 1 is a partially cutaway, isometric view of the insulative fabric of the present invention.

As shown in FIG. 1, the insulative fabric of the present invention generally comprises four layers. Outer layers 10 and 12 of hollow, microtubular, filamentous, synthetic insulation sandwich inner layers 14 and 16. One inner layer is a sheet 14 of breathable, substantially crinkle-free, pliant, aluminized polyethylene film having a thickness of no greater than about 1.25 mils and having about 8 ohms of aluminization deposited on one surface of the sheet. Immediately adjacent this sheet 14 is a sheet 16 of nonwoven polyester material which provides sufficient tensile strength for the overall fabric so that the fabric may be used as a quilting material in quilts, comforters, or clothing.

Figure 2:
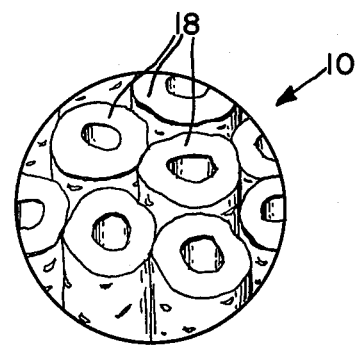
FIG. 2 is a detailed isometric of the synthetic insulative layer of FIG. 1.

The individual filaments 18 (FIG. 2) of the synthetic insulation in the outside layers 10 and 12 are individually needle-punched through the inner layers 14 and 16 to reduce the overall thickness of the insulation without substantially reducing the insulative capacity of the fabric and to provide passageways through the film so that the film is breathable.

A completed insulated fabric of the present invention thus has a soft, fleecy quality; is of a substantially uniform, predetermined thickness of no greater than about 0.50 inch (1.27 cm); and is substantially noiseless when folded or wrinkled.

A thin film of polyethylene is particularly desirable for use as the reflective sheet at the center of the insulative fabric. Conventional aluminized sheets usually include a thin layer of polyester. These sheets are too rigid for use in the present invention because they crinkle significantly when folded or wrinkled. Through experimentation, it has been found that a pliant, thin layer of polyethylene is a highly desirable substitute. The polyethylene, however, generally has insufficient tensile strength to allow use of the fabric in clothing, comforters, or quilts. Therefore, it is important to use a scrim layer to provide the necessary tensile strength. The scrim layer is attached directly above the polyethylene film and is interconnected with the polyethylene film through the needle punching.

Quilts made with the insulative fabric of the present invention have a generally uniform insulative capability because the fabric will not bunch up and will not build up higher layers of thermal heat resistance. This insulative fabric is preferable for use in quilts, comforters, or clothing because of its uniform insulative capability. The insulative fabric is fully breathable, so the fabric of the present invention is a decided improvement over the conventional "Space Blanket." In a thickness of less than about 0.50 inch (1.27 cm), the insulative fabric of the present invention can provide adequate warming for most winter uses. This insulative ability is a combination of the use of between about 5-15 ounces of synthetic insulation per square yard of fabric and a reflective layer of aluminized polyethylene. The individual contributions of the separate insulative materials is not completely understood, but it is felt that the heat transfer capability of the fabric can be easily adjusted by varying the amount of synthetic insulation used.

The fabric of the present invention has one additional feature, namely, that the fabric is two-sided. That is, on one side of the fabric, an insulative reflective layer is incorporated into the fabric. Thus, the overall insulative fabric may be oriented to either expel heat or to retain it. Generally, when used as a comforter, the insulative fabric will be placed so that the reflective layer reflects heat toward to the person using the comforter.

The unique, lightweight insulative fabric of the present invention thus is a decided advance over previously developed, synthetic insulative fabrics. This insulative fabric is able to compete favorably with natural insulators and can be produced at a decidedly reduced cost. The overall uniformity of the fabric makes it particularly desirable to meet the thermal insulative needs of the present market.

I claim:

1. An insulative fabric, comprising:
   (a) a central sheet of breathable, substantially crinkle-free, pliant, aluminized polymeric film having sufficient tensile strength for use as a quilting fabric in quilts, comforters, or clothing; and
   (b) spaced layers of hollow, microtubular, filamentous insulation sandwiching the film, each layer being needle-punched through the film
   (1) to reduce the overall thickness of the insulation without substantially reducing the insulative capacity of the fabric, and
   (2) to provide passageways through the film so that the film is breathable,
   wherein the fabric has a soft, fleecy quality; is of a substantially uniform, predetermined thickness; and is substantially noiseless when folded or wrinkled.

2. The fabric of claim 1, further comprising a sheet of nonwoven polyester material adjacent one side of the film and sandwiched by the insulation, the material providing substantially all of the tensile strength which allows the fabric to be used as a quilting fabric.

3. The fabric of claim 2 wherein the film is a polyethylene sheet having a thickness of no greater than about 1.25 mils, and the insulation is a polyester.

4. The fabric of claim 3 wherein the polyethylene film has about 18 ohms of aluminization deposited on one side.

5. The fabric of claim 4 wherein the fabric has an overall thickness of less than about 0.50 inch (1.27 cm) and includes between about 5-15 ounces of insulation/square yard of fabric.

6. An insulative fabric, consisting of:
   (a) a central sheet of breathable, substantially crinkle-free, pliant, aluminized polyethylene film having a thickness of no greater than about 1.25 mils and having about 8 ohms of aluminization deposited on one surface of the sheet;
   (b) a nonwoven polyester material adjacent the film to provide sufficient tensile strength to the fabric so that the fabric may be used as a quilting material in quilts, comforters, or clothing; and
   (c) spaced layers of hollow, microtubular, filamentous polyester insulation, each layer being independently needle-punched through the film and material
   (1) to reduce the overall thickness of the insulation without substantially reducing the insulative capacity of the fabric, and
   (2) to provide passageways through the film so that the film is breathable,
   wherein the fabric has a soft, fleecy quality; is of a substantially uniform, predetermined thickness of no greater than about 0.50 inch (1.27 cm); and is substantially noiseless when folded or wrinkled.

7. An insulative fabric, comprising:
   (a) a sheet of substantially crinkle-free, pliant, aluminized polyethylene;
   (b) a scrim backing sheet adjacent to one side of the polyethylene to provide sufficient tensile strength to the fabric so that the fabric may be used as a quilting material in quilts, comforters, or clothing; and
   (c) spaced layers of hollow, microtubular, filamentous polyester insulation sandwiching the polyethylene and scrim backing sheet, each layer being needle-punched through the polyethylene and scrim backing sheet
   (1) to reduce the overall thickness of the fabric without substantially reducing the insulative capacity of the fabric, and
   (2) to make the fabric breathable by providing air passageways through the polyethylene and scrim backing sheet,
   wherein the fabric has a soft, fleecy quality; is of a substantially uniform, predetermined thickness; is substantially noiseless when folded or wrinkled, wherein one layer of insulation is immediately adjacent one surface of the polyethylene and the other layer of insulation is immediately adjacent one surface of the scrim backing sheet, and wherein the scrim backing sheet and polyethylene having abutting surfaces.

8. The fabric of claim 7 wherein the scrim backing sheet is a nonwoven material.

9. An insulative fabric, comprising:
   (a) a central sheet of breathable, substantially crinkle-free, pliant, aluminized polyethylene having sufficient tensile strength for use as a quilting material in quilts, comforters, or clothing; and
   (c) spaced layers of hollow, microtubular, filamentous insulation sandwiching the polyethylene, each layer being needle-punched through the polyethylene
      (1) to reduce the overall thickness of the insulation without substantially reducing the insulative capacity of the fabric, and
      (2) to make the fabric breathable by providing air passageways through the polyethylene,
   wherein the fabric has a soft, fleecy quality; is of a substantially uniform, predetermined thickness; and is substantially noiseless when folded or wrinkled.

* * * * *